(12) United States Patent
Efrati et al.

(10) Patent No.: US 9,210,574 B2
(45) Date of Patent: *Dec. 8, 2015

(54) METHOD AND APPARATUS FOR VERIFYING THE AUTHENTICITY OF MOBILE DEVICE INFORMATION

(71) Applicant: VONAGE NETWORK LLC, Holmdel, NJ (US)

(72) Inventors: Tzahi Efrati, Hoboken, NJ (US); Jaya Meghani, Old Bridge, NJ (US)

(73) Assignee: Vonage Network LLC, Holmdel, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 14/621,535

(22) Filed: Feb. 13, 2015

(65) Prior Publication Data

US 2015/0163673 A1 Jun. 11, 2015

Related U.S. Application Data

(63) Continuation of application No. 13/962,020, filed on Aug. 8, 2013, now Pat. No. 8,965,342.

(51) Int. Cl.
| | |
|---|---|
| *H04M 1/66* | (2006.01) |
| *H04W 12/06* | (2009.01) |
| *H04L 29/06* | (2006.01) |
| *H04W 8/20* | (2009.01) |
| *H04W 12/12* | (2009.01) |

(52) U.S. Cl.
CPC ........... *H04W 12/06* (2013.01); *H04L 63/0876* (2013.01); *H04L 63/1466* (2013.01); *H04W 8/205* (2013.01); *H04W 12/12* (2013.01)

(58) Field of Classification Search
USPC ........ 455/411, 434, 410, 426.1, 426.2, 552.1, 455/561, 433; 370/229, 312, 315, 328, 338, 370/352, 356, 462, 466, 393, 392, 395.1, 370/395.2, 395.21, 395.3, 395.31, 395.32, 370/524; 709/225, 227, 220, 226, 228, 229, 709/206, 223, 224, 232, 201, 218, 238, 245, 709/246, 249; 380/247, 248, 249; 713/168, 713/169, 170, 171, 172, 173, 174, 175, 176, 713/177, 178, 179, 180; 714/4.1, 49, 22, 714/13; 715/744; 726/28

See application file for complete search history.

(56) References Cited

U.S. PATENT DOCUMENTS

| | | |
|---|---|---|
| 6,052,803 A | 4/2000 | Bhatia et al. |
| 6,124,799 A | 9/2000 | Parker |
| 6,745,326 B1 | 6/2004 | Wary |
| 6,934,269 B1 | 8/2005 | Hasha et al. |
| 2002/0187780 A1 | 12/2002 | Souissi |
| 2005/0020308 A1 | 1/2005 | Lai |
| 2005/0235363 A1 | 10/2005 | Hibbard et al. |
| 2011/0281551 A1 | 11/2011 | Gonzalez et al. |
| 2013/0061151 A1 | 3/2013 | Perry |

FOREIGN PATENT DOCUMENTS

WO WO2011/008140 A1 1/2011

*Primary Examiner* — Charles Appiah
*Assistant Examiner* — Alexander Yi
(74) *Attorney, Agent, or Firm* — Moser Taboada; Joseph Pagnotta (57) ABSTRACT

Methods and apparatus for verifying authenticity of device information of an end-user device are provided herein. In some embodiments, a method for verifying authenticity of device information of an end-user device may include sending a request to verify device information of an end-user device receiving, responsive to the request, verification information regarding the device information sent, and performing a verification analysis on the verification information received.

20 Claims, 5 Drawing Sheets

METHOD AND APPARATUS FOR VERIFYING THE AUTHENTICITY OF MOBILE DEVICE INFORMATION

CROSS-REFERENCE TO RELATED APPLICATION

This application is a continuation of co-pending U.S. patent application Ser. No. 13/962,020 filed Aug. 8, 2013, which is incorporated hereby reference in its entirety.

BACKGROUND OF THE INVENTION

1. Field of the Invention

Embodiments of the present invention generally relate to telecommunication systems and, more particularly, to a method and apparatus for verifying the authenticity of device information of a telephony device.

2. Description of the Related Art

Telephony service providers and/or mobile app developers may wish to provide telephony services to an end user through an app. For example, telephony service providers may provide mobile apps that users can install on their smartphone, or other type of mobile devices, that allow users to make Voice over IP (VoIP) calls from their mobile phone.

Calls from a VoIP caller typically display the caller ID (CID) information of the caller to the called party. Upon installation/registration of the mobile VoIP app, the mobile VoIP app may prompt users to enter the phone number of the device before using the app. However, the user may potentially enter any phone number to be used as the CID since there is no inherent verification that the number provided is actually associated with the device (or even belongs to the user). That is, the inventor has observed that it is very easy for a VoIP caller to "spoof" his/her CID to appear as someone they are not. CID information is often centrally maintained on a Public Switched Telephone Network (PSTN) in a Caller Name (CNAM) database. Generally, service providers access the CNAM database to retrieve caller ID data. However, the CNAM request for information is based on the calling number that is provided by the caller and, in the case of a VoIP call, that number is freely editable by the caller without any verification. This prevents called parties from screening calls from unknown or undesirable callers (such as telemarketers).

Mobile apps may attempt to verify and update the "correct" device phone number through an automatic API call to the device's operating system. However, this method is similarly deficient, as the device user could simply replace the device phone number with any number of her choosing for example, by modifying the information in the phone's settings.

Other methods to prevent undesired spoofing may include independent verification that the claimed telephone number provided by the user is, in fact, associated with the user's device. This is typically done through an "out of band" channel that maps to that phone number, such as a phone call or SMS to that phone number. However, this approach may be inconvenient and more costly as it requires additional steps, time and resources to perform the authentication. Moreover, such "out of band" means may be unreliable (such as when the user is roaming). In addition, this method could potentially be abused by requesting "out of band" verifications to numbers owned by persons who have no desire to use the app.

Accordingly, there exists a need in the art for a convenient way to authenticate the association between a telephone number and a given device without resorting to out-of-band authentication steps.

SUMMARY OF THE INVENTION

Methods and apparatus for verifying authenticity of device information of an end-user device are provided herein. In some embodiments, a method for verifying authenticity of device information of an end-user device may include sending a request to verify device information of an end-user device receiving, responsive to the request, verification information regarding the device information sent, and performing a verification analysis on the verification information received.

In some embodiments, a method for verifying authenticity of device information of an end-user device may include receiving device information from an end-user device, performing a database lookup operation using at least a portion of the device information received to obtain verification information for verifying authenticity of the device information, and sending at least one of a portion of the verification information obtained, or an indication that at least a portion of the device information has either been verified or not verified.

In some embodiments, a system for verifying authenticity of device information of an end-user device may include a device information module to obtain device information stored on the end-user device, a transmission module to send requests for verification information and to receive requested verification information, wherein the request includes at least a portion of the device information obtained, and a verification module to verify authenticity of the device information obtained used the verification information received.

Other and further embodiments of the present invention are described below.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. The figures are not drawn to scale and may be simplified for clarity. It is contemplated that elements and features of one embodiment may be beneficially incorporated in other embodiments without further recitation.

DETAILED DESCRIPTION

Embodiments of the present invention generally relate methods and apparatus for verifying the authenticity of device information of a telephony device. Embodiments of the present invention advantageously improve upon the CID feature, particularly with respect to Voice over Internet Protocol (VoIP) service providers and mobile apps used in providing VoIP telephony service. Those skilled in the art will appreciate that embodiments of the present invention can also be used with non-VoIP telephony mobile apps that may also need to verify the authenticity of identification information of a mobile device.

Some portions of the detailed description which follow are presented in terms of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the following description, the terms VoIP system, VoIP telephony system, Internet protocol (IP) system and IP telephony system are all intended to refer to a system that connects callers and that delivers data, text and video communications using IP data communications. After a user subscribes to a VoIP service, the user can make/receive phone calls to/from other VoIP subscribers or to public switched telephone network (PSTN) customers and access a number of features associated with the VoIP service, such as call waiting, three-way calling, call forwarding, voicemail service, and the like.

Figure 1:
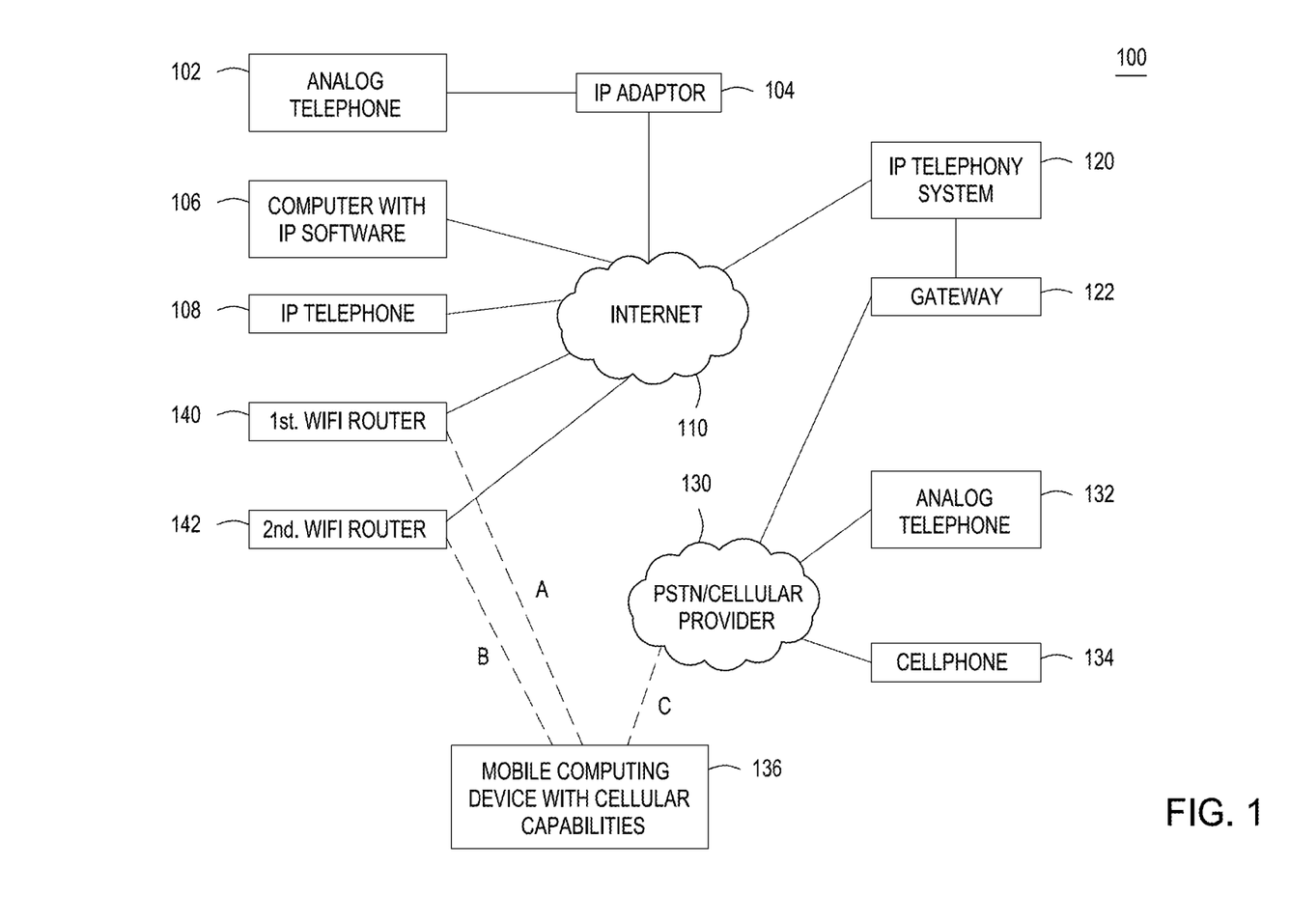
FIG. 1 depicts a block diagram of a telecommunication network, according to one or more embodiments of the invention.

As illustrated in FIG. 1, a communications environment 100 is provided to facilitate IP enhanced communications. An IP telephony system 120 enables connection of telephone calls between its own customers and other parties via data communications that pass over a data network 110. The data network 110 is commonly the Internet, although the IP telephony system 120 may also make use of private data networks. The IP telephony system 120 is connected to the Internet 110. In addition, the IP telephony system 120 is connected to a PSTN 130 via a gateway 122. The PSTN 130 may also be directly coupled to the Internet 110 through one of its own internal gateways (not shown). Thus, communications may pass back and forth between the IP telephony system 120 and the PSTN 130 through the Internet 110 via a gateway maintained within the PSTN 130.

The gateway 122 allows users and devices that are connected to the PSTN 130 to connect with users and devices that are reachable through the IP telephony system 120, and vice versa. In some instances, the gateway 122 would be a part of the IP telephony system 120. In other instances, the gateway 122 could be maintained by a third party.

Customers of the IP telephony system 120 can place and receive telephone calls using an IP telephone 108 that is connected to the Internet 110. Such an IP telephone 108 could be connected to an Internet service provider via a wired connection or via a wireless router. In some instances, the IP telephone 108 could utilize the data channel of a cellular telephone system to access the Internet 110.

Alternatively, a customer could utilize an analog telephone 102 which is connected to the Internet 110 via a telephone adapter 104. The telephone adapter 104 converts analog signals from the telephone 102 into data signals that pass over the Internet 110, and vice versa. Analog telephone devices include but are not limited to standard telephones and document imaging devices such as facsimile machines. A configuration using a telephone adapter 104 is common where the analog telephone 102 is located in a residence or business. Other configurations are also possible where multiple analog telephones share access through the same IP adaptor. In those situations, all analog telephones could share the same telephone number, or multiple communication lines (e.g., additional telephone numbers) may provisioned by the IP telephony system 120.

In addition, a customer could utilize a soft-phone client running on a computer 106 to place and receive IP based telephone calls, and to access other IP telephony systems (not shown). In some instances, the soft-phone client could be assigned its own telephone number. In other instances, the soft-phone client could be associated with a telephone number that is also assigned to an IP telephone 108, or to a telephone adaptor 104 that is connected one or more analog telephones 102.

Users of the IP telephony system 120 are able to access the service from virtually any location where they can connect to the Internet 110. Thus, a customer could register with an IP telephony system provider in the U.S., and that customer could then use an IP telephone 108 located in a country outside the U.S. to access the services. Likewise, the customer could also utilize a computer outside the U.S. that is running a soft-phone client to access the IP telephony system 120.

A third party using an analog telephone 132 which is connected to the PSTN 130 may call a customer of the IP telephony system 120. In this instance, the call is initially connected from the analog telephone 132 to the PSTN 130, and then from the PSTN 130, through the gateway 122 to the IP telephony system 120. The IP telephony system 120 then routes the call to the customer's IP telephony device. A third party using a cellular telephone 134 could also place a call to an IP telephony system customer, and the connection would be established in a similar manner, although the first link would involve communications between the cellular telephone 134 and a cellular telephone network. For purposes of this explanation, the cellular telephone network is considered part of the PSTN 130.

In the following description, references will be made to an "IP telephony device." This term is used to refer to any type of device which is capable of interacting with an IP telephony system to complete an audio or video telephone call or to send and receive text messages, and other forms of communications. An IP telephony device could be an IP telephone, a computer running IP telephony software, a telephone adapter which is itself connected to a normal analog telephone, or some other type of device capable of communicating via data packets. An IP telephony device could also be a cellular telephone or a portable computing device that runs a software application that enables the device to act as an IP telephone. Thus, a single device might be capable of operating as both a cellular telephone that can facilitate calls over voice channels, and an IP telephone that can facilitate calls over data channels.

The following description will also refer to a mobile telephony device. The term "mobile telephony device" is intended to encompass multiple different types of devices. In some instances, a mobile telephony device could be a cellular telephone. In other instances, a mobile telephony device may be a mobile computing device, such as the APPLE IPHONE, that includes both cellular telephone capabilities and a wireless data transceiver that can establish a wireless data connection to a data network. Such a mobile computing device could run appropriate mobile apps to conduct VoIP telephone calls via a wireless data connection. Thus, a mobile computing device, such as an APPLE IPHONE, a RIM BLACKBERRY or a comparable device running GOOGLE ANDROID operating system could be a mobile telephony device.

In still other instances, a mobile telephony device may be a device that is not traditionally used as a telephony device, but which includes a wireless data transceiver that can establish a wireless data connection to a data network. Examples of such devices include the APPLE IPOD TOUCH and the IPAD. Such a device may act as a mobile telephony device once it is configured with appropriate application software.

FIG. 1 illustrates that a mobile computing device with cellular capabilities 136 (e.g., a smartphone) is capable of establishing a first wireless data connection A with a first wireless access point 140, such as a WiFi or WiMax router. The first wireless access point 140 is coupled to the Internet 110. Thus, the mobile computing device 136 can establish a VOIP telephone call with the IP telephony system 120 via a path through the Internet 110 and the first wireless access point 140.

FIG. 1 also illustrates that the mobile computing device 136 can establish a second wireless data connection B with a second wireless access point 142 that is also coupled to the Internet 110. Further, the mobile computing device 136 can establish either a third wireless data connection C via a data channel provided by a cellular service provider 130 using its cellular telephone capabilities, or establish a telephone call via a voice channel provided by a cellular service provider 130. The mobile computing device 136 could also establish a VoIP telephone call with the IP telephony system 120 via the second wireless connection B or the third wireless connection C.

Although not illustrated in FIG. 1, the mobile computing device 136 may be capable of establishing a wireless data connection to a data network, such as the Internet 110, via alternate means. For example, the mobile computing device 136 might link to some other type of wireless interface using an alternate communication protocol, such as the WiMax standard.

Figure 2:
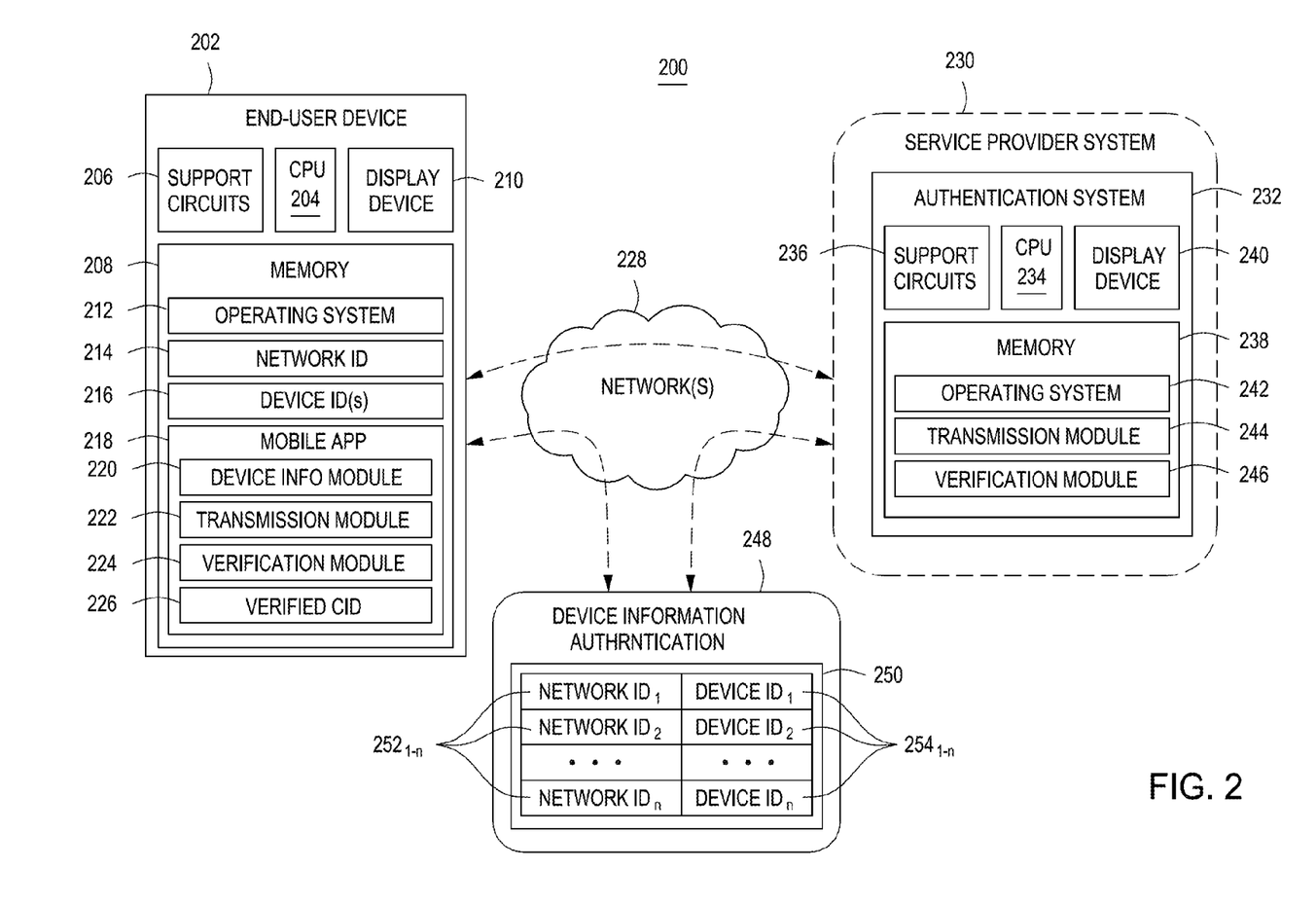
FIG. 2 depicts a block diagram of a system for verifying the authenticity of device information of a telephony device, according to one or more embodiments.

FIG. 2 depicts a block diagram of a system 200 for verifying the authenticity of device information of an end-user device, according to one or more embodiments. The system 200 comprises end-user device 202, service provider system 230, and device information authentication entity 248 communicatively coupled via networks 228. In some embodiments, end-user device 202 may be mobile computing device 136, and service provider system 230 may be IP telephony system 120 as described above in FIG. 1.

The end-user device 202 comprises a Central Processing Unit (CPU) 204, support circuits 206, memory 208, and the display device 210. The CPU 204 may comprise one or more commercially available microprocessors or microcontrollers that facilitate data processing and storage. The various support circuits 206 facilitate the operation of the CPU 204 and include one or more clock circuits, power supplies, cache, input/output circuits, and the like. The memory 208 comprises at least one of Read Only Memory (ROM), Random Access Memory (RAM), disk drive storage, optical storage, removable storage and/or the like. In some embodiments, the memory 208 comprises an operating system 212, network ID 214, device ID(s) 216, and a mobile app 218.

The operating system (OS) 212 generally manages various computer resources (e.g., network resources, file processors, and/or the like). The operating system 212 is configured to execute operations on one or more hardware and/or software modules, such as Network Interface Cards (NICs), hard disks, virtualization layers, firewalls and/or the like. Examples of the operating system 212 may include, but are not limited to, various versions of LINUX, MAC OSX, BSD, UNIX, MICROSOFT WINDOWS, IOS, ANDROID and the like. In some embodiments, operating system 212 may include an application programming interface (API) which can be used to access and user device information and features (such as, for example, by mobile app 218).

The network ID 214 is associated with the location of the device. It can be a phone number or IP address, for example. The network ID 214 may be entered by the user or directly obtained from the operating system (e.g., through API calls). The network ID is typically used as the caller ID information, or used as a lookup key to obtain caller ID information from a CNAM system.

The device ID 216 is an identifier associated with the device. It can be accessed directly from the operating system (e.g., through API calls). Some non-limiting examples of device identifiers that may be used in embodiments consistent with the present invention include an International Mobile Subscriber Identity (IMSI), an International Mobile Station Equipment Identity (IMEI), a push notification token, a Temporary Mobile Subscriber Identity (TMSI), and the like.

An IMSI may be used to identify the user of a cellular network and is a unique identification associated with all cellular networks. It is stored as a 64 bit field and is sent by the phone to the network. It is generally a 15-digit number. The first 3 digits are the mobile country code (MCC), which designates the country of the mobile network operator. The second 2 or 3 digits are the mobile network code (MNC), which designates the particular mobile network operator in the country. The remaining digits are the mobile subscription identification number (MSIN), which identify a particular subscriber within the service provider's customer base. In some embodiments, the IMSI may be accessible, for example, through API calls made to the operating system 212. In some embodiments, a third-party authentication entity (e.g., such as device information authentication entity 248) would need to verify the IMSI with the end-user's service provider.

An IMEI is a number that uniquely identifies a given phone. Unlike the IMSI, the IMEI is not related to the subscriber, but to the device itself. The IMEI is typically only used for identifying the device and has no permanent or semi-permanent relation to the subscriber. An IMEI may be accessible, for example, through API calls made to the operating system 212.

A push notification token identifies an instance of a mobile app on a specific device. Other mobile apps on the same device will have a different ID. The same instance of a mobile app on a different device will also have a different ID. Push notification tokens are used some mobile operating systems such as APPLE IOS. In some embodiments, the push notification token is generated as a result of a request from the mobile app the first time it is launched. For example, a request from a mobile app installed on an IPHONE may be sent to APPLE which generates the token, sends it back to the IPHONE where it is picked up (e.g., via an OS API or a automatic notification) and processed by the mobile app. From there, the mobile app can send the token to its servers. In some embodiments, a third-party authentication entity (e.g., such as device information authentication entity 248) would need to verify the push notification token with the operator of the push notification service, e.g., APPLE PUSH NOTIFICATION SERVICE.

TMSI is an alternative to IMSI. In some embodiments, the TMSI changes every time the device switches location (and thus, may be considered to be even more secure than an IMSI or (MEI). TMSI is randomly assigned to every mobile in a specific area the moment it is switched on. The TMSI number assigned is local to a location area, and so it has to be updated each time the mobile device moves to a new geographical area. The TMSI device information may be collected via API calls to the operating system 212.

In some embodiments, the mobile app 218 is a VoIP app that provides over-the-top (OTT) VoIP telephony services to an end-user. In some embodiments, OTT content describes broadband delivery of media/data/services without a traditional cellular service provider (e.g., PSTN provider 130) being involved in the control or distribution of the content itself. The provider may be aware of the contents of the IP packets but is not responsible for, nor able to control, the viewing abilities, copyrights, and/or other redistribution of the content. In some embodiments, an end-user may download the mobile app 218 from service provider system 230, or from an app distribution system associated with the service provider system 230, and install the mobile app 218 on their device. Although the mobile app 218 is described herein as a separate stand-alone application, in some embodiments the mobile app 218 may be integrated into OS 212, and may use existing API calls provided by the OS 212 to access or control various features of the end-user device 202.

In some embodiments mobile app 218 may include a device information module 220, transmission module 222, a verification module 224, and verified caller ID information (CID) 226. In some embodiments the device information module 220 may be used to obtain device information stored on the end-user device 202. The device information obtained includes network ID 214 device IDs 216. The device information module 220 may use API calls to operating system 212 to obtain the device information. Transmission module 222 may be used to send and receive information that will be used by verification module 224 to verify the device information, and in particular the network ID 214, of end-user device 202 that may have been set by an end-user associated with the end-user device 202. In some embodiments, the transmission module 222 may encrypt information that will be used by verification module 224 to verify the device information, or otherwise transmit the information in a secure format. In some embodiments, the verified CID 226 may be stored in a secure format (e.g., encrypted, or the like) and assessable only by mobile app 218 (i.e., may not be accessed or modified by an end-user).

The networks 228 comprise one or more communication systems that connect computers by wire, cable, fiber optic and/or wireless link facilitated by various types of well-known network elements, such as hubs, switches, routers, and the like. The networks 228 may include an Internet Protocol (IP) network (such as internet 110 of FIG. 1), a public switched telephone network (PSTN) (such as the PSTN network of PSTN provider 130 of FIG. 1), or other mobile communication networks, and may employ various well-known protocols to communicate information amongst the network resources.

In some embodiments, service provider system 230 may be a VoIP service provider or a mobile app developer. Service provider system 230 may include an authentication system 232 that may be used to verify the authenticity of the device information provided by end-user device 202. The authentication system 232 comprises a Central Processing Unit (CPU) 234, support circuits 236, memory 238, and an optional the display device 240. The CPU 234 may comprise one or more commercially available microprocessors or microcontrollers that facilitate data processing and storage. The various support circuits 236 facilitate the operation of the CPU 234 and include one or more clock circuits, power supplies, cache, input/output circuits, and the like. The memory 238 comprises at least one of Read Only Memory (ROM), Random Access Memory (RAM), disk drive storage, optical storage, removable storage and/or the like. In some embodiments, the memory 208 comprises an operating system 242, transmission module 244, and verification module 246. The operating system (OS) 242 generally manages various computer resources (e.g., network resources, file processors, and/or the like). The operating system 242 is configured to execute operations on one or more hardware and/or software modules, such as Network Interface Cards (NICs), hard disks, virtualization layers, firewalls and/or the like. Examples of the operating system 242 may include, but are not limited to, various versions of LINUX, MAC OSX, BSD, UNIX, MICROSOFT WINDOWS, IOS, ANDROID and the like.

In some embodiments, device information authentication entity 248 may be a entity that provides authentication/verification information to service provider system 230 by agreement. In some embodiments, authentication entity 248 may be, or maintain, a database 250 that associates network IDs $252_{1-n}$ and device IDs $254_{1-n}$ of end users. Database 250 may be any data structure or data source that maintains an association of network IDs $252_{1-n}$ and device IDs $254_{1-n}$. The service provider system 230 may have direct or indirect access to database 250. For example, database 250 may exist on the service provider system 230 (direct access), or be accessible through a third party network (indirect access). For example, the service provider system 230 may be a VoIP service provider or a mobile app developer that provides OTT telephony services and may have agreements with trusted third-party providers to allow access to IMSI-phone number association databases. It is also possible to have similar arrangements with other entities (such as corporate enterprise services administrators) for IMEI-phone number association databases.

For example, in at least one embodiment where device information authentication entity 248 may be a third party entity, end-user device 202 may be an IPHONE and device information authentication entity 248 may be a device/OS manufacturer (e.g., APPLE). APPLE may maintain a database 250 of information associated with end-user device 202 such as network IDs $252_{1-n}$ and device IDs $254_{1-n}$ (e.g., an association of telephone numbers and IMEIs). Service provider system 230 may have an agreement with APPLE provide device information verification information when requested.

Figure 3A:
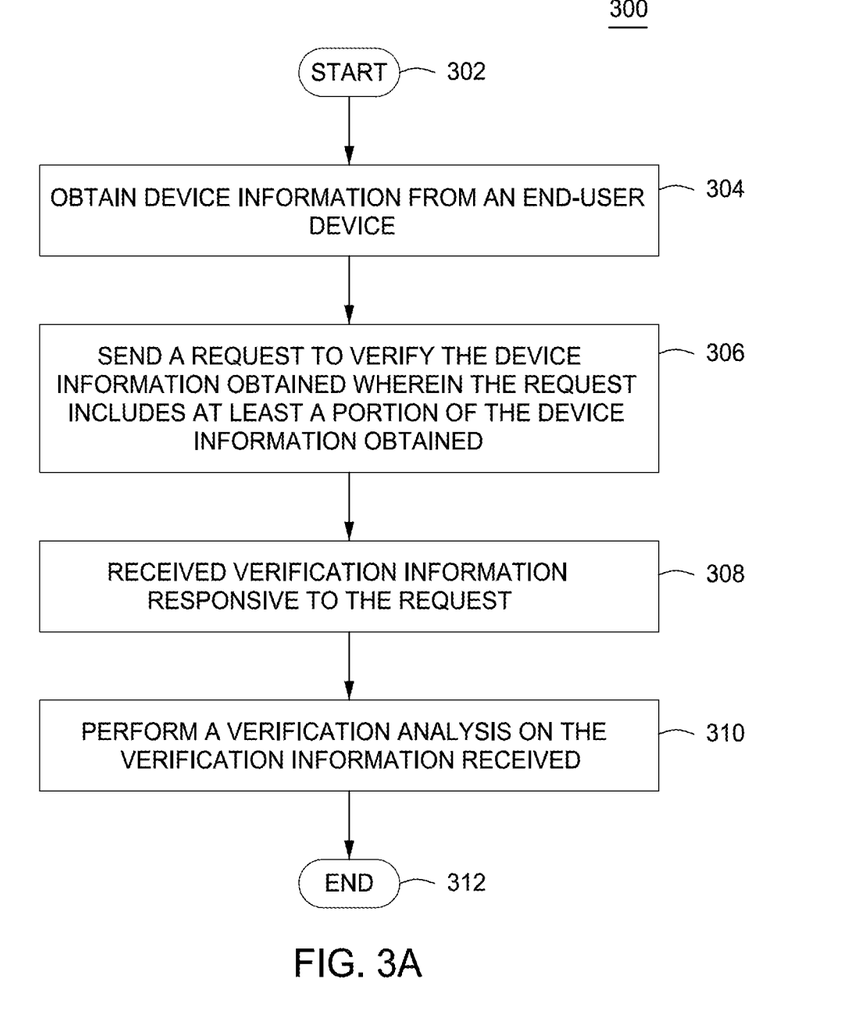
FIG. 3A depicts a flow diagram of a method for verifying the authenticity of device information of a telephony device, according to one or more embodiments.

Exemplary methods that may be performed by one or more elements of system 200 for verifying authenticity of device information of an end-user device are described below with respect to FIGS. 3A and 3B. FIG. 3A depicts a flow diagram of a method 300 verifying authenticity of device information of an end-user device. The method 300 starts at 302 and proceeds to 304. At 304, device information from an end-user device is obtained. In some embodiments the device information includes a network ID(s) 214 and device ID(s) 216 associated with an end-user device 202. In some embodiments, the device information may be requested, or otherwise obtained, by device information module 220 of mobile app 218 via API calls to operating system 212. In other embodiments, the device information may be obtained by an authentication system 232 of a service provider system 230. For example, transmission module 244 may receive the device information from an end-user device 202.

After the device information is obtained at 304, a request to verify that the device information obtained may be sent at 306. In some embodiments the request may include at least a portion of the device information obtained. For example, the request may include only the network ID 214, only the device ID 216, or both. In some embodiments the request may include multiple network IDs 214 and/or multiple device IDs 216. The requests may be sent over a secure (e.g., encrypted channel). The format of the requests sent may be in a predetermined standard format/protocol recognizable by the receiving device. For example, exemplary formats/protocols used may include a Type-Length-Value (TLV), XML, JS, VCard, HTTP message formats, SIP message formats and the like.

In some embodiments, the request may be prepared and sent by transmission module 222 of mobile app 218 on end-user device 202. The request may be sent to an authentication system 232 service provider system 230. In embodiments where the method 300 is performed by authentication system 232, the request may be sent by transmission module 244 of authentication system 232 to another internal or external authentication entity (such as, e.g., device information authentication entity 248).

At 308, verification information is received responsive to the request sent. In some embodiments, the verification information may be received from an authentication system 232 of service provider system 230 which may have obtained the requested information from an internal or external (i.e., third party) device information authentication entity 248. In other embodiments, the verification may be received directly from a device information authentication entity 248. The verification information may include one or more network IDs 252 and/or device IDs 254 associated with the device information sent in the request. The type of information included in the verification information is based on the device information sent in the request. For example, if a network ID 214 was sent in the request at 306, the verification information received may include a device ID 254 that was associated with network ID 214 sent. If a device ID 216 was sent in the request at 306, the verification information received may include a network ID 252 that was associated with the device ID 216 sent. If both a network ID 214 and a device ID 216 were included in the request at 306, the verification information received may include a network ID 252 and device ID 254 associated with the network ID 214 and device ID 216 sent in the request. In some embodiments if both network ID 214 and device ID 216 were included in the request at 306, the verification information may include an indication or notification that the network ID 214 was either verified or not verified. The above examples are non-limiting and it is understood that other combinations of device information sent/verification information received may be used in embodiments consistent with the present invention.

After receiving the verification information at 308, a verification analysis is performed on the verification information received at 310. In some embodiments, the verification analysis may be performed by verification module 224 of end-user device 202, or may be performed by verification module 246 of authentication system 232.

If the verification information received only includes a device ID 254 associated with network ID 214 that was sent in the request at 306, then the verification analysis performed includes comparing device ID 216 of end-user device 202 (i.e., the first device ID) with the received device ID 254 included in the verification information (i.e., the second device ID). If device ID 216 matches device ID 254, then it is determined that the authenticity of network ID 214 that was sent in the request at 306 has been verified. In some embodiments, after the network ID 214 has been verified, mobile app 218 will store the verified network ID as a verified caller ID 226 to be used as caller ID information when making telephone calls via mobile app 218. Otherwise, if device ID 216 does not match device ID 254 received in the verification information, then it is determined that the authenticity of the network ID 214 that was sent to the request 306 has not been verified. If a network ID has not been verified, the device may default to an existing "out of band" channel verification scheme (e.g., SMS verification) as described above. In other embodiments, if a network ID has not been verified the mobile app may display or otherwise indicate that the Caller ID was not verified to users receiving communications from the unverified device. Still, in other embodiments, the mobile app may not allow the use the app unless at least a portion of the device information has been verified.

If the verification information received only includes a network ID 252 associated with device ID 216 that was sent in the request at 306, then the verification analysis performed includes comparing network ID 214 of end-user device 202 (i.e., the first network ID) with the received network ID 252 included in the verification information (i.e., the second network ID). If network ID 214 matches network ID 252, then it is determined that the authenticity of the network ID 214 has been verified. In some embodiments, after the network ID 214 has been verified, mobile app 218 will store the verified network ID as a verified caller ID 226 to be used as caller ID information when making telephone calls via mobile app 218. Otherwise, if network ID 214 does not match network ID 252 received in the verification information, then it is determined that the authenticity of the network ID 214 has not been verified. In some embodiments, if network ID 214 does not match network ID 252 (i.e., network ID 214 has not been verified), mobile app 218 will store the network ID 252 as a verified caller ID 226 to be used as caller ID information when making telephone calls via mobile app 218.

In some embodiments, if the verification information received includes an indication that the first network ID has either been verified are not verified, the verification analysis performed may include determining whether the network ID has been verified are not based on indication and updating the verified caller ID 226 accordingly.

The method 300 ends at 312.

Figure 3B:
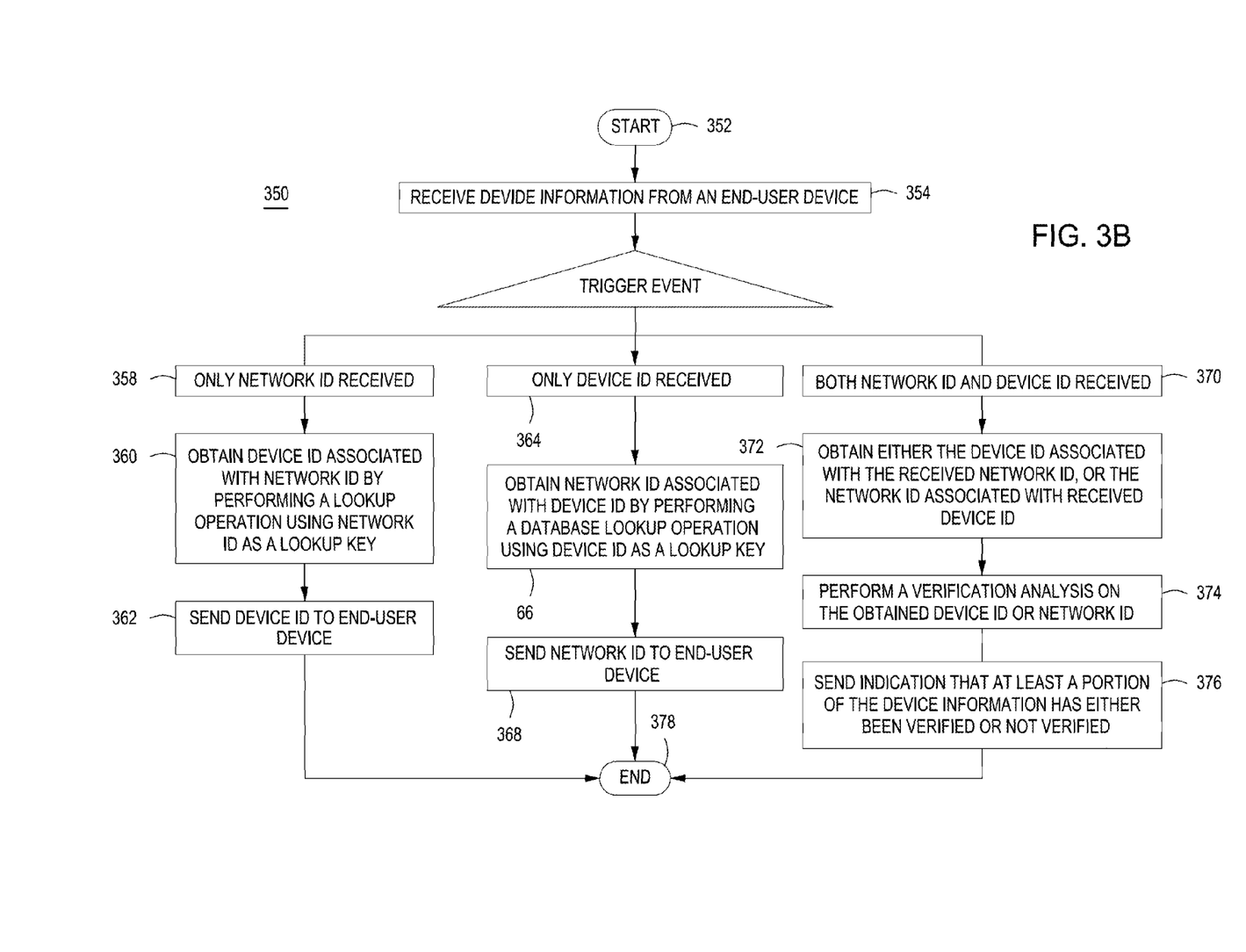
FIG. 3B depicts a flow diagram of another method for verifying the authenticity of device information of a telephony device, according to one or more embodiments.

FIG. 3B depicts a flow diagram of a method 350 verifying authenticity of device information of an end-user device. In some embodiments method 350 may be performed by authentication system 232 service provider system 230. The method 350 starts at 352 and proceeds to 354. At 354, device information is received from an end-user device. The device information received may include a network ID and/or one or more device ID(s) of the end-user device 202. The type of information included in the device information received may determine the subsequent steps performed by the method 350 as will be described below.

For example, in some embodiments, if only network ID 214 is received at 354, then a device ID 254 associated with network ID 214 is obtained by performing a lookup operation on database 250 using network ID 214 as a lookup key at step 360. At 362, the device ID 254 obtained will be sent to the end-user device 202. The method 350 ends at 378.

If, at 364, only the device ID 216 is received from end-user device 202, then network ID 252 associated with device ID 216 is obtained by performing a lookup operation on database 250 using device ID 216 F the lookup key at step 366. At 368, the network ID 252 obtained will be sent to the end-user device 202. The method 350 ends at 378.

If, at 370, both network ID 214 and device ID 216 are received from the end-user device 202, then authentication system 232 may use either the received device ID 216 or the received network ID 214 to obtain, at step 372, the associated device information from database 250 to perform a verification analysis. For example, at 372, authentication system 232 may obtain device ID 254 by performing a lookup operation on database 250 using network ID 214 as a lookup key. At 374, authentication system 232 may perform a verification analysis by comparing the obtained device ID 254 with the received device ID 216. Based on the results of the comparison performed, authentication system 232 may send an indication that at least a portion of the device information has either been verified or not verified at 376. In some embodiments, the device information received from end-user device 202 at step 354 may be sent directly to a device information authentication entity 248. The device information authentication entity 248 may provide device information from database 250 to the system/device requesting the information, or may provide an indication that the device information sent to it is verified or not verified.

The method 350 ends at 378.

The embodiments of the present invention may be embodied as methods, apparatus, electronic devices, and/or computer program products. Accordingly, the embodiments of the present invention may be embodied in hardware and/or in software (including firmware, resident software, micro-code, and the like), which may be generally referred to herein as a "circuit" or "module". Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus or device. More specific examples (a non exhaustive list) of the computer-readable medium include the following: hard disks, optical storage devices, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Figure 4:
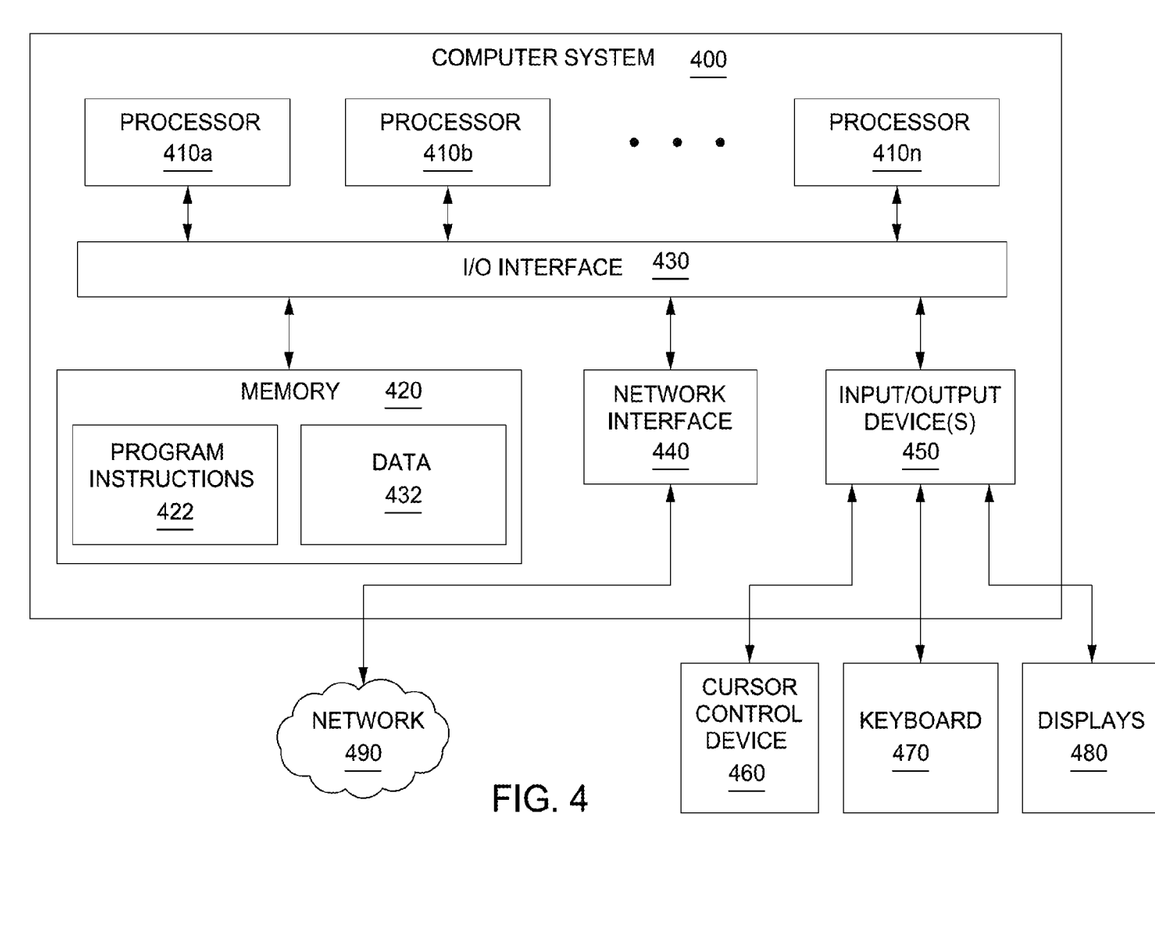
FIG. 4 depicts a computer system that can be utilized in various embodiments of the present invention, according to one or more embodiments.

FIG. 4 depicts a computer system 400 that can be utilized in various embodiments of the present invention to implement the computer and/or the display, according to one or more embodiments.

Various embodiments of method and apparatus for organizing, displaying and accessing contacts in a contact list, as described herein, may be executed on one or more computer systems, which may interact with various other devices. One such computer system is computer system 400 illustrated by FIG. 4, which may in various embodiments implement any of the elements or functionality illustrated in FIGS. 1-3B. In various embodiments, computer system 400 may be configured to implement methods described above. The computer system 400 may be used to implement any other system, device, element, functionality or method of the above-described embodiments. In the illustrated embodiments, computer system 400 may be configured to implement methods 300 and 350 as processor-executable executable program instructions 422 (e.g., program instructions executable by processor(s) 410) in various embodiments.

In the illustrated embodiment, computer system 400 includes one or more processors 410*a*-410*n* coupled to a system memory 420 via an input/output (I/O) interface 430. Computer system 400 further includes a network interface 440 coupled to I/O interface 430, and one or more input/output devices 450, such as cursor control device 460, keyboard 470, and display(s) 480. In various embodiments, any of the components may be utilized by the system to receive user input described above. In various embodiments, a user interface may be generated and displayed on display 480. In some cases, it is contemplated that embodiments may be implemented using a single instance of computer system 400, while in other embodiments multiple such systems, or multiple nodes making up computer system 400, may be configured to host different portions or instances of various embodiments. For example, in one embodiment some elements may be implemented via one or more nodes of computer system 400 that are distinct from those nodes implementing other elements. In another example, multiple nodes may implement computer system 400 in a distributed manner.

In different embodiments, computer system 400 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In various embodiments, computer system 400 may be a uniprocessor system including one processor 410, or a multiprocessor system including several processors 410 (e.g., two, four, eight, or another suitable number). Processors 410 may be any suitable processor capable of executing instructions. For example, in various embodiments processors 410 may be general-purpose or embedded processors implementing any of a variety of instruction set architectures (ISAs). In multiprocessor systems, each of processors 410 may commonly, but not necessarily, implement the same ISA.

System memory 420 may be configured to store program instructions 422 and/or data 432 accessible by processor 410. In various embodiments, system memory 420 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 420. In other embodiments, program instructions and/or data may be received, sent or stored upon different types of computer-accessible media or on similar media separate from system memory 420 or computer system 400.

In one embodiment, I/O interface 430 may be configured to coordinate I/O traffic between processor 410, system memory 420, and any peripheral devices in the device, including network interface 440 or other peripheral interfaces, such as input/output devices 450. In some embodiments, I/O interface 430 may perform any necessary protocol, timing or other data transformations to convert data signals from one component (e.g., system memory 420) into a format suitable for use by another component (e.g., processor 410). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. Also, in some embodiments some or all of the functionality of I/O interface 430, such as an interface to system memory 420, may be incorporated directly into processor 410.

Network interface 440 may be configured to allow data to be exchanged between computer system 400 and other devices attached to a network (e.g., network 490), such as one or more external systems or between nodes of computer system 400. In various embodiments, network 490 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 440 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

Input/output devices 450 may, in some embodiments, include one or more display terminals, keyboards, keypads, touchpads, scanning devices, voice or optical recognition devices, or any other devices suitable for entering or accessing data by one or more computer systems 400. Multiple input/output devices 450 may be present in computer system 400 or may be distributed on various nodes of computer system 400. In some embodiments, similar input/output devices may be separate from computer system 400 and may interact with one or more nodes of computer system 400 through a wired or wireless connection, such as over network interface 440.

In some embodiments, the illustrated computer system may implement any of the methods described above, such as the methods illustrated by the flowcharts of FIGS. 3A and 3B. In other embodiments, different elements and data may be included.

Those skilled in the art will appreciate that computer system 400 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via intercomputer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 400 may be transmitted to computer system 400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The methods described herein may be implemented in software, hardware, or a combination thereof, in different embodiments. In addition, the order of methods may be changed, and various elements may be added, reordered, combined, omitted or otherwise modified. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A method performed by a service provider system for verifying authenticity of device information of an end-user device comprising: obtaining, from an end-user device, device information stored on the end-user device, wherein the device information comprises a first network identifier and a first device identifier, wherein the first network identifier is one of a telephone number or an Internet Protocol (IP) address of the end-user device, and wherein the first device identifier is one of an International Mobile Subscriber Identity (IMSI), an International Mobile Station Equipment Identity (IMEI), a push notification token, or a Temporary Mobile Subscriber Identity (TMSI); sending, to a device information authentication entity, a request to verify the device information obtained, including (A) the first network identifier or (B) the first device identifier; receiving, from the device information authentication entity and responsive to the request, verification information regarding the device information sent including (A) a second device identifier associated with the first network identifier or (B) a second network identifier associated with the first device identifier; and storing, based on the verification information received, one of (A) the first network identifier as a verified caller identification information (CID) value if the authenticity of the first network identifier has been verified based on a comparison of the first device identifier and the second device identifier or (B) an indicator indicating that the first network identifier has not been verified.

2. The method of claim 1, wherein responsive to receiving the verification information, a verification analysis on the verification information received is performed to authenticate an association between the first network identifier and the first device identifier.

3. The method of claim 2, wherein the request includes the first network identifier, and wherein the verification information received includes a second device identifier associated with the first network identifier.

4. The method of claim 3, wherein the verification analysis performed includes comparing the first device identifier with the second device identifier and determining that the authenticity of the first network identifier is verified when the first device identifier and the second device identifier correspond to each other.

5. The method of claim 2, wherein the request includes the first device identifier, and wherein the verification information received includes a second network identifier associated with the first device identifier.

6. The method of claim 5, wherein the verification analysis performed includes comparing the first network identifier with the second network identifier and determining that the authenticity of the first network identifier is verified when the first network identifier and the second network identifier correspond to each other.

7. The method of claim 2, wherein the request includes both the first network identifier and the first device identifier, wherein the verification information received includes an indication that the first network ID has either been verified, and wherein the first network identifier is stored as a verified CID value.

8. The method of claim 1, wherein the device information is obtained via at least one Application Programming Interface (API) call to an operating system running on the end-user device.

9. The method of claim 1, wherein the request including the at least one of the first network identifier or the first device identifier is sent to the device information authentication entity over an encrypted channel.

10. The method of claim 1, wherein the CID value is maintained in a secure format on the end-user device.

11. A system performed by a service provider system for verifying authenticity of device information of an end-user device comprising: a device information module configured to obtain, from an end-user device, device information stored on the end-user device, wherein the device information comprises a first network identifier and a first device identifier, wherein the first network identifier is one of a telephone number or an Internet Protocol (IP) address of the end-user device, and wherein the first device identifier is one of an International Mobile Subscriber Identity (IMSI), an International Mobile Station Equipment Identity (IMEI), a push notification token, or a Temporary Mobile Subscriber Identity (TMSI); a transmission module configured to: send, to a device information authentication entity, a request for verification information, including (A) the first network identifier or (B) the first device identifier, and receive, from the device information authentication entity, the requested verification information regarding the device information sent, wherein the requested verification information received includes (A) a second device identifier associated with the first network identifier or (B) a second network identifier associated with the first device identifier; a verification module configured to verify authenticity of the device information obtained; and a storage module configured to store one of (A) the second network identifier as a verified caller identification information (CID) value if the authenticity of the first network identifier has been verified based on a comparison of the first device ID with the second device ID or (B) an indicator indicating that the first network identifier has not been verified.

12. The system of claim 11, wherein the verification module is further configured to perform a verification analysis on the verification information received to authenticate an association between the first network identifier and the first device identifier.

13. The system of claim 12, wherein the request includes the first network identifier, wherein the verification information received includes a second device identifier associated with the first network identifier, and wherein the verification analysis includes a comparison the first device identifier with the second device identifier and a determination that the authenticity of the first network identifier is verified when the first device identifier and the second device identifier correspond to each other.

14. The system of claim 12, wherein the request includes the first device identifier, wherein the verification information received includes a second network identifier associated with the first device identifier, and wherein the verification analysis includes a comparison the first network identifier with the second network identifier and a determination that the authenticity of the first network identifier is verified when the first network identifier and the second network identifier correspond to each other.

15. A method, performed by a service provider system, for verifying authenticity of device information of an end-user device comprising: receiving, from an end-user device, device information stored on the end-user device, wherein the device information comprises a first network identifier and a first device identifier, wherein the first network identifier is one of a telephone number or an Internet Protocol (IP) address of the end-user device, and wherein the first device identifier is one of an International Mobile Subscriber Identity (IMSI), an International Mobile Station Equipment Identity (IMEI), a push notification token, or a Temporary Mobile Subscriber Identity (TMSI); sending, to a device information authentication entity, a request including (A) the first device identifier or (B) the first network identifier; receiving, from the device information authentication entity and responsive to the request, verification information regarding the device information sent, wherein the requested verification information received includes (A) a second network identifier associated with the first device identifier or (B) a second device identifier associated with the first network identifier; performing a verification analysis on the verification information received to authenticate the first network ID; and sending (A) an indication to the end-user device that the second network identifier can be stored as a caller identification information (CID) value or (B) an indication to the end user device that the first network identifier has been verified and can be used as the CID.

16. The method of claim 15, wherein the request includes the first network identifier, and wherein the verification information received includes a second device identifier associated with the first network identifier.

17. The method of claim 16, wherein the verification analysis performed includes comparing the first device identifier with the second device identifier and determining that the authenticity of the first network identifier is verified when the first device identifier and the second device identifier correspond to each other.

18. The method of claim 15, wherein the request includes the first device identifier, and wherein the verification information received includes a second network identifier associated with the first device identifier.

19. The method of claim 18, wherein the verification analysis performed includes comparing the first network identifier with the second network identifier and determining that the authenticity of the first network identifier is verified when the first network identifier and the second network identifier correspond to each other.

20. The method of claim 15, wherein the request includes both the first network identifier and the first device identifier, wherein the verification information received includes an indication that the first network ID has either been verified, and wherein the first network identifier is stored as a verified CID value.

* * * * *